DOUBLE HETERODYNE RADIO RECEIVER

Inventors
ROGER BATAILLE &
GEORGES HONORAT
By Haseltine, Lake & Co.
Attorneys

Inventors
ROGER BATAILLE &
GEORGES HONORAT
By Haseltine, Lake & Co.
Attorneys

Inventors
ROGER BATAILLE + GEORGES HONORAT
By Haseltine, Lake & Co.
Attorneys

Inventors
ROGER BATAILLE &
GEORGES HONORAT
By Haseltine, Lake & Co.
Attorneys

Inventors
ROGER BATAILLE &
GEORGES HONORAT
By Haseltine, Lake & Co.
Attorneys

Inventors
ROGER BATAILLE &
GEORGES HONORAT
By Haseltine, Lake & Co.
Attorneys.

DOUBLE HETERODYNE RADIO RECEIVER

Inventors
ROGER BATAILLE + GEORGES HONORAT
By Haseltine, Lake + Co.
Attorneys

Patented Aug. 5, 1952 2,606,285

UNITED STATES PATENT OFFICE 2,606,285

DOUBLE HETERODYNE RADIO RECEIVER

Roger Bataille and Georges Honorat, Neuilly-sur-Seine, France, assignors to Societe Française des Telecommunications, Neuilly-sur-Seine, France, a corporation of France Application October 18, 1946, Serial No. 704,074
In France November 23, 1942

Section 1, Public Law 690, August 8, 1946
Patent expires November 23, 1962

9 Claims. (Cl. 250—20)

It has long been a problem for those skilled in the art to stabilize radio-electric transmitters as well as receivers in order that they may be tuned on a previously determined constant wave length for any desired position of their controls. In the devices of the conventional type, the desired frequency variations in transmission as well as in reception are obtained by means of at least one variable capacitor. Under the effect of a number of factors, such as variations in temperature, pressure, etc., the resonant frequency may vary in the conventional devices for the same position of the controlling member by about $1/1000$; for frequencies higher than 50 kc., this variation may escape the tuned band of a receiver which is initially correctly adjusted. This is the reason why it has been necessary until now to "tune up" the receiver, i. e. to use a trial and error method, appreciating acoustically the changes in intensity of the reception and even, in certain cases, to alter the adjustment of the receiver during prolonged reception.

Attempts have already been made to eliminate this defect by using crystal devices to determine the resonant frequency of a transmitter as well as of a receiver. A quartz or other piezo-electric crystal enables the determination of frequency with much higher precision, of the order of $1/100{,}000$. However, the use of these devices has not so far produced the desired continuous variation. A quartz device gives only, for example, the basic frequency and its various harmonics, i. e. in any case a strictly limited number of frequencies. In practice, this results in a number of defects, particularly in the military field where the necessity of transmitting over one or more previously determined frequencies of a limited number permits easy identification of the user of these frequencies.

The present invention has for its object to benefit simultaneously from the advantages inherent to oscillating devices of the quartz type and to oscillators of the continuous type, for example a variable capacitor, with the added benefit of eliminating simultaneously the defects of these devices. According to the invention, the frequency band on which it is desired to operate continuously and which may be a very large one—even a band covering all the frequencies used in radio transmission—is covered by one or more quartz devices, preferably not more than one or two, which, taking into account the harmonics of the crystal or crystals, evenly divides the overall band into a plurality of elementary bands which may be covered continuously by means of an oscillator of known continuously variable type. In other words, if it is desired to tune a receiver according to the invention to any wave length which the set may use, the set is tuned by means of a quartz device on an approximate frequency supplied by the piezo-electric oscillations, and the negative or positive complement to obtain the desired wave length is supplied by the continuously variable oscillator.

It is readily seen, on the one hand, that the whole of the band may be covered in a continuous manner as in the case of an oscillator of the conventional type and, on the other hand, that the maximum error introduced, which is obviously the sum of the errors introduced by the quartz device and by the continuously variable oscillator, is always very small. The error resulting from the quartz device, amounting to only $1/100{,}000$ of the frequency, always remains very small even if this frequency is high; the error introduced by the continuously variable oscillator, though amounting to $1/1000$ of its frequency, is small, since this frequency has such a small absolute value, amounting only to the requisite complement to be added to the frequency of the quartz device.

If it is desired for example to continuously cover a band from 0 (theoretical) to 30,000 kc. or, more probably, from 100 kc. to 30,000 kc. the following method may be used:

A first quartz stabilized oscillator provides crystal frequencies of 1000, 2000 etc. up to 30,000 kc. which differ one from the other by 1000 kc. A second oscillator, again quartz stabilized, provides in each of the 1000 kc. sections thus defined, intermediate divisions having a 100, 200, 300 etc. up to a 1000 kc. difference. A third continuously variable conventional oscillator having a range of from 100 to 200 kc. provides a continuous variation in each of the 100 kc. bands thus limited.

The maximum errors thus introduced are as follows: in the first quartz circuit, 0.30 kc.; in the second quartz circuit 0.01 kc.; in the continuously variable circuit 0.2 kc.; i. e. a total of 0.51 kc. This maximum variation will not exceed the normal band pass range of a receiver so that the latter keeps tuned in spite of any disturbing factors which may occur. Accordingly, to obtain stable reception on any desired wave length, it will only be necessary to adjust the controls of the receiver to the position corresponding to said wave length, without groping or continuous audible monitoring.

On the other hand, the resulting frequency has no troublesome parasitic frequencies, the nearest one being —30 decibels, far from any useful final reception, even in the most unfavorable case.

In the above example, the control operations for reception are limited to three:

(1) Selection of the 1000ths by means of a 30 step switch;

(2) Selection of the 100ths by means of a 10 step switch;

(3) Selection of the units from 0 to 100 kc. by means of a graduated dial.

The invention relates, therefore, to a radio-electric receiver of the frequency change or superheterodyne type, in which the local frequencies are piezo-electric controlled, except that the local oscillations of lowest frequency are caused to vary in a continuous manner over a narrow band to secure continuity between the frequencies of the oscillations obtained by piezo-electric means.

Said receiver has only a small drift and may be tuned on a determined frequency by bringing its controls opposite the figures corresponding to frequency divisions, the stability of the control being good enough to maintain the tuning in spite of any disturbing factor.

The receiver thus allows the reception of transmissions of any frequency within a band of any desired width defined by the local oscillator or oscillators and their harmonics.

In this form of receiver the received oscillations are subjected in a standard mixer stage to a first frequency change by means of a local oscillator, the frequency of which is piezo-electrically stabilized, the resulting oscillations having an intermediate frequency restricted to a relatively narrow frequency band. The second local oscillator with the continuous frequency variation thus may have an inherent frequency low enough to introduce only a small frequency drift, the division of the incident frequencies into sections due to the effect of the frequencies of the first local oscillator being such that in no case will the latter cause troublesome interference to reception.

In the preferred embodiment of the invention the injection of this first local frequency having an amplitude necessarily higher than that of the incident oscillations may be made without disturbing effect on reception due to the fact that its effect on the stages following the mixer is eliminated by means of an opposition arrangement.

The various piezo-electric stabilized local frequencies may be obtained by means of a small number of crystals due to the fact that the oscillator or oscillators controlled by the latter include a harmonics generating and selecting device.

In the following description, reference is made to the annexed drawings in which.

It is pointed out that in the following description the figures given for the frequency values are intended only for a proper understanding of the description. As such, they are only illustrative numerical examples.

Figures 1, 2:
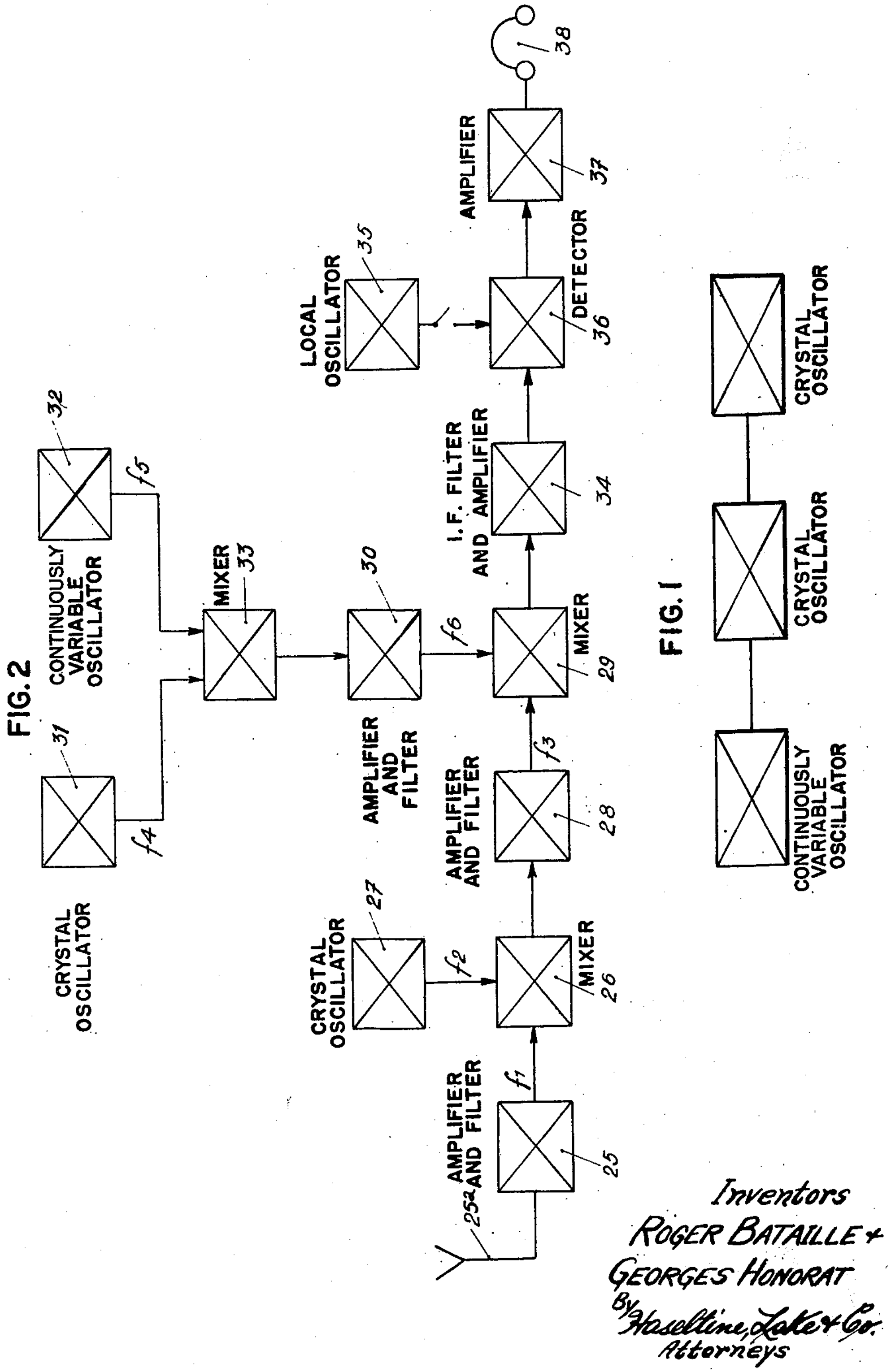
Fig. 1 is a general block diagram of a radio-receiver according to the invention.
Fig. 2 is a block diagram of a receiver according to the invention.

Referring to Fig. 1, A is an oscillator of the conventional continuously variable frequency type, for example a heterodyne. B is a piezo-electric crystal oscillator capable of adjustment to a number of determined frequencies, namely the basic frequency of the crystal and a number of its harmonics. C is also a piezo-electric crystal oscillator capable of adjustment to a number of determined frequencies, namely the basic frequency of the crystal and a number of its harmonics.

If, for example, it is desired to cover with this device a continuous frequency band between 100 kc. and 30,000 kc., the oscillators may be selected with characteristics such that the oscillator A will generate oscillations capable of continuous variation from 100 kc. to 200 kc., the oscillator B will generate frequencies of 100, 200, 300, etc. up to 1000 kc., and the oscillator C will generate oscillations of a frequency of 1000, 2000, 3000, etc. up to 30,000 kc. If, for example, it is desired to tune the set on the 25,495 kc. frequency, the oscillator C will be adjusted on 25,000 kc., the oscillator B on 400 kc. and the oscillator A on 95 kc.; said frequencies are added and the final frequency is the desired frequency. This frequency is obtained with a maximum error of 0.5 kc. as stated above.

Figure 2 is a block diagram of a receiver according to a preferred form of the invention. It must be understood that the various figures stated for said receiver do not have an absolute value and are given only for the purpose of better understanding of the construction and operation.

The receiver comprises a pre-selection filter 25, receiving from an aerial 25$^a$ transmitted radio frequency oscillations which may theoretically vary from 1 to 24,000 kc. Said oscillations having a frequency designated $F^1$ are led to a first frequency changer stage 26 simultaneously with the local oscillations from a piezo-electric generator 27, controlled according to the operation of the pre-selection filter 25. The frequency $F^2$ of the oscillations from the generator 27 may vary by 1000 kc. steps from 0 (theoretical) to 23,000 kc. The piezo-electric crystal of the generator 27 has, for example, a basic reasonant frequency of 1000 kc. and from this basic frequency supplies the various harmonics up to 23,000 kc.

The frequency changer stage 26 is so designed as to produce oscillations of a frequency $F^3$ equal to the sum or difference of frequencies $F^1$ and $F^2$. A filter 28 receiving the oscillations of frequencies $F^1$, $F^2$, and $F^3$, eliminates both of the first frequencies, passing only the frequency $F^3$, the intermediate frequency, comprised between 1000 and 2000 kc.

The oscillations of frequency $F^3$ are led to a second frequency changer stage 29, simultaneously with the oscillations from a filter 30. The latter result from mixing the oscillations of frequency $F^4$ of a piezo-electric crystal generator 31 with the oscillations of frequency $F^5$ from a continuously variable frequency generator 32 of conventional form.

The piezo-electric crystal controlling the generator 31 has, for example, a basic frequency of 1000 kc. and supplies the various harmonics necessary to have a frequency $F^4$ varying by 100 kc. steps between 400 and 1300 kc. The frequency $F^5$ may vary in a continuous manner over a 100 kc. band, for example between 125 and 225 kc.

The oscillations of frequency $F^4$ and those of frequency $F^5$ are led to a mixing device 33, aggregating them to frequency $F^6$. Filter 30 receiving the oscillations of frequency $F^4$, $F^5$ and $F^6$, will pass only the frequency $F^6$ which may thus vary in a continuous manner from 525 to 1525 kc.

The oscillations of $F^3$ frequency and those of $F^6$ frequency, the former varying from 1000 to 2000 kc. and the latter varying from 525 to 1525 kc., are led to the second frequency changing stage 29 having their difference at a constant value equal to 475 kc. which constitutes the final intermediate frequency of the receiver.

The remaining part of the set is of standard design. It may include, for example, an intermediate frequency device 34 whose oscillations are led simultaneously with the oscillations of a local generator 35, at a constant frequency of 474 kc., to a detection device 36. The audio frequency signal, suitably amplified by a device 37, will be led to a loudspeaker 38.

Figure 3:
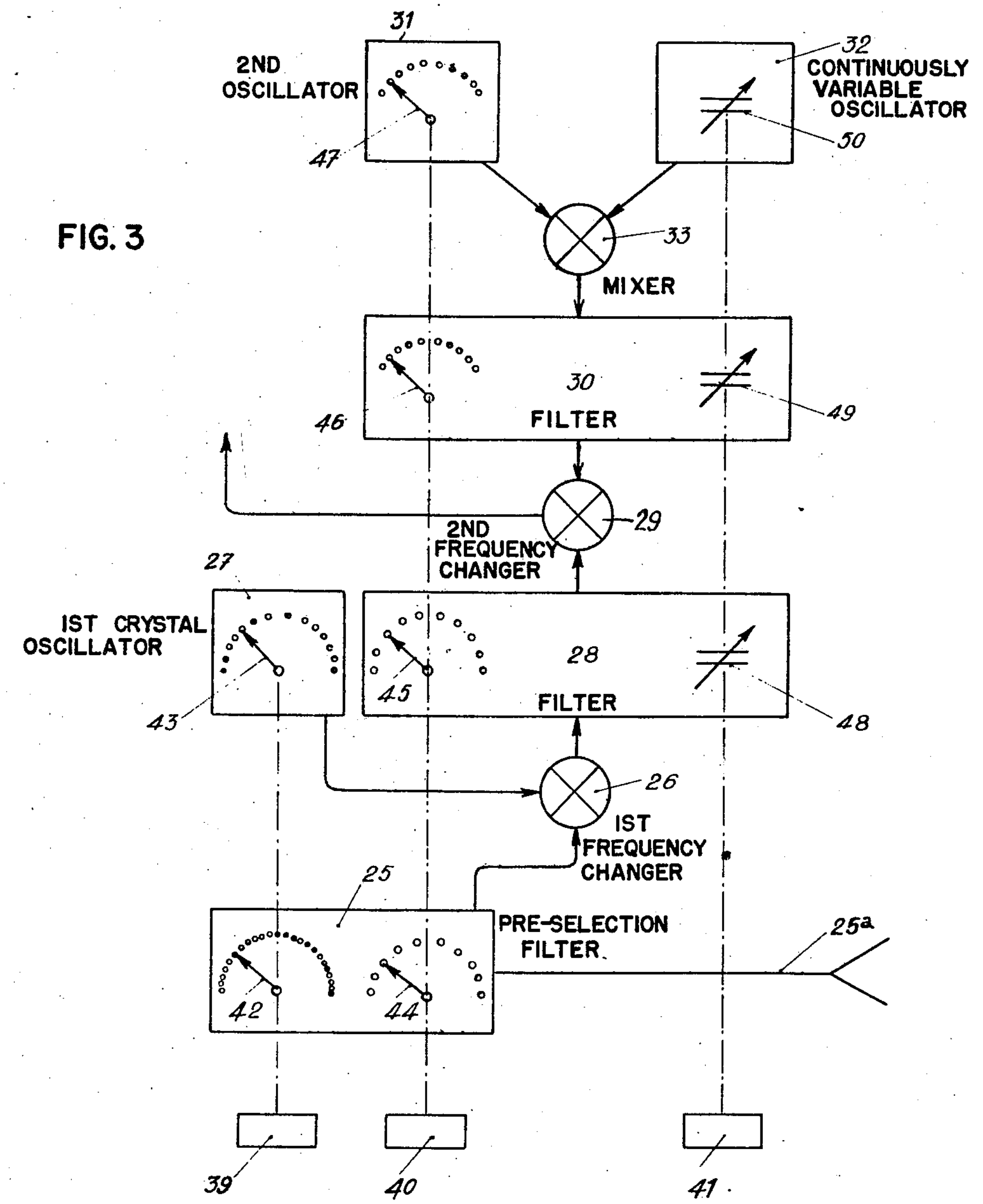
Fig. 3 shows the controls of the receiver shown in Fig. 2.

Referring now to Fig. 3 showing certain features of the construction and operation of the receiver according to the invention, more specifically its controls, the set includes three control knobs: a knob 39 for the selection of the kc. thousands, a knob 40 for the selection of the kc. hundreds and a knob 41 for the kc. units between 0 and 100.

Knob 39 controls a handlever 42 of the preselection filter 25 and a handlever 43 of the generator 27. The knob 39 moves on a scale graduated from 0 to 23 and has twenty-four steps. The twenty-four corresponding positions of handlever 43 of the generator 27 enables the latter to be tuned to the frequencies 0 (theoretical), 1000, 2000, 3000, etc. 23,000 kc.

Knob 40 has ten steps and controls a handlever 44 of the pre-selection filter 25, a handlever 45 of the filter 28, a handlever 46 of the filter 30 and a handlever 47 of the generator 31. Adjusting the pre-selection filter 25 by means of handlevers 42 and 44 will roughly tune up the latter on a 100 kc. range to the radio frequency of the incident oscillations to be received.

Knob 41, which may be moved in a continuous manner, controls a variable capacitor 48 or the like to tune filter 28, a variable capacitor 49 or the like to tune filter 30 and a variable capacitor 50 or the like to tune the continuously variable generator 32.

Filter 28 may thus, by operating the handlever 45 and the variable capacitor 48, be adjusted continuously on the intermediate frequency $F^3$ comprised between 1000 and 2000 kc.

The frequency changer 26 is fed by filter 25 and by generator 27 in such a manner that, in the most unfavorable case, the image will be at $2 \times F^3$, i. e. at a minimum of 2000 kc. from the frequency to be allowed to pass and accordingly the attenuation of the image to 60 decibels may be secured by the conventional means, the tuning up being made for any point of the 100 kc. passing band, at a maximum of 3 decibels from the point of the centered frequency.

Filter 30 is adjusted through the operation of handlever 46 and variable capacitor 49 to the suitable frequency between 525 and 1525 kc. this adjustment being made by the handlever 46 per 100 kc. steps and by the variable capacitor 49 within said steps.

The frequency $F^6$ of the oscillations issuing from filter 30 varies and is synchronized with the frequencies generated on the one hand by generator 31 and on the other hand by generator 32; the handlever 47 of the generator 31, as well as the handlever 46, being driven by knob 40, and the variable capacitor 50 of generator 32, as well as the variable capacitor 49, being driven by knob 41.

In "0" position of knob 39, the frequency $F^2$ generated by the generator 27, amounts to 1000 kc. and is added to incident frequency $F^1$ in such a manner that the incident frequencies $F^1$ comprised between 0 (theoretical) and 1000 kc., will due to the frequency change in the device 26, be transformed into oscillations of a frequency comprised between 1000 and 2000 kc.

In position "1" of knob 39, generator 27 is disconnected. The frequency changer 26 operates then as a direct amplifier and transfers without frequency change to filter 28 the incident frequency comprised between 1000 and 2000 kc.

In position "2" of knob 39, the frequency of the generator 27 will be again 1000 kc. and will be subtracted from the incident frequency comprised between 2000 and 3000 kc.

The intermediate frequency $F^3$ will be thus again comprised between 1000 and 2000 kc., the same applying to every higher position, 3, 4, 5, etc. 23 of knob 39.

It is obvious that various combinations of subtraction or addition of frequencies may be used, changing, if necessary, the value of the frequencies from generator 27 by correspondingly changing the position of handlever 43.

The receiver according to the invention allows, inserting if necessary a double frequency changer, covering the whole chosen reception band in a continuous manner, for example from 0 (theoretical) to 24,000 kc., without changing the intermediate frequency. Accordingly, a control usually found in receivers of known type is eliminated, producing an important and practical simplification.

In addition, the operation of the unit scale from end to end always corresponds to a 100 kc. band for any considered range of frequency; thus a uniform spreading of the wave lengths will be obtained for any desired frequency.

The receiver according to the invention has perfect stability, high enough to tune up at will to the desired transmission by simply adjusting the graduated dials to the figure characterizing the frequency of the transmitter, without the necessity of using a trial and error method as in the case of receivers of known type.

In the most unfavorable case, i. e. in the reception of a transmission on 24,000 kc., the maximum possible drift will be the sum of the following drifts:

(*a*) The drift corresponding to oscillations of a 23,000 kc. frequency of the oscillator device 27, which, being of piezo-electric type, has a precision of $1/100{,}000$; the maximum drift of said oscillator 27 will accordingly be 0.23 kc.

(*b*) The drift introduced by the oscillator 31, of piezo-electric type, reaching a maximum when the oscillations generated have a value of 1300 kc., and amounting to 1/100,000 of said value, i. e. to 0.013 kc.

(c) The drift introduced by the continuously variable generator 32 which for the maximum of 225 kc. amounts of 1/1000 of said value, i. e. to 0.225 kc.

The maximum total drift for the receiver will thus be 0.468 kc., i. e. a figure small enough to remain within the limits of receiver drift and interference.

A more detailed diagram of the receiver will now be described with reference to Fig. 4. The incident oscillations caught by the aerial $a$ are led to the pre-selection device comprising two oscillating circuits, parallel connected, the first one comprising multi-tap inductance $s^1$ and capacitor $c^1$; the second oscillating circuit comprises a multi-tap inductance $s^2$ cooperating with the handlever 44. The first oscillating circuit may be tuned up, according to the handlever position 42, on frequencies of 0, 1000, 2000, etc. 23,000 kc., and the second oscillating circuit may be tuned up on ten successive frequencies having an interval of 100 kc. between them. The pre-selection filter may thus be tuned up on 240 successive bands, each having a width of 100 kc.

The oscillations of a frequency $F^1$, from the preselection filter, are fed to a mixer tube $l^1$, in which $r^1$ is the control grid leak resistor (automatic volume control) and $c^3$ is the uncoupling capacitor of said grid. $r^6$ is the screen-grid resistance of tube $l^1$ and $c^8$ is the uncoupling capacitor of said screen-grid. The injection grid of tube $l^1$ is connected to an oscillating circuit comprising a multi-tap inductance $s^3$, and capacitor $c^2$ corresponding to the various taps, in order to tune up said oscillating circuit, in the selected example to 0, 1000, 2000, etc. 23,000 kc. $c^4$ is the coupling capacitor of the injection grid of tube $l^1$ and $r^2$ is the grid leak resistor. The oscillating circuit $s^3$—$c^2$ is inserted at the outlet of a harmonic generating tube $l^2$, of which $r^5$ is the screen-grid resistance, and $r^7$ the uncoupling capacitor of said grid. Tube $l^2$ is inserted after an oscillating tube $l^3$, fed by a piezo-electric crystal $q^1$, having a basic frequency of 1000 kc. for example. $r^4$ is the grid leak resistor of tube $l^3$. The oscillating circuit, in which tube $l^3$ is inserted, comprises an inductance $s^4$ and a capacitor $c^6$ and is tuned up to a 1000 kc. frequency. The connection between tube $l^3$ and tube $l^2$ comprises a capacitor $c^5$; $r^3$ is the grid leak resistor of tube $l^2$.

At the outlet of tube $l^1$ is an oscillating circuit consisting in a multi-tap inductance $s^5$, controlled by the handlever 45, and a variable capacitor $cv^1$, the capacity of which may vary continuously over a 100 kc. band. Padding capacitors are series connected to the taps of winding $s^5$ for ganging purposes. The oscillations from tube $l^1$ are fed to a tube $l^4$ through a coupling capacitor $c^9$ and thus may vary continuously from 1000 to 2000 kc., per 1000 kc. step.

Tube $l^4$, which is the second frequency changer, is for example of the triode-hexode type. $r^7$ is the control grid leak resistor for automatic de-polarization and constitutes an automatic volume control; $c^{19}$ is the uncoupling capacitor of said grid. The feeding resistor of the screen grid is shown at $r^{16}$ and the uncoupling capacitor at $c^{19}$. The injection grid of tube $l^4$ is fed through an oscillating circuit comprising a multi-tap inductance $s^6$ and a variable capacitor $cv^2$ in order to be continuously tuned up from 525 to 1525 kc. The inductance $s^6$ allows tuning to 525, 625 etc. 1425 kc. and the capacitor $cv^2$ permits covering of the 100 kc. band over each of the above values. Padding capacitors are series connected to the taps of inductance $s^6$ for ganging purposes. Said oscillating circuit and tube $l^4$ are connected by a capacitor $c^{10}$; $r^8$ is the injection grid leak resistor of said tube.

The oscillating circuit comprising the inductance $s^6$ and the capacitor $cv^2$ is inserted at the outlet of an oscillating mixer tube $l^5$, of the triode-hexode type for example. The latter tube generates oscillations, controlled by the oscillating circuit formed by inductance $s^7$ and variable capacitor $cv^3$; $r^{10}$ is the feed resistance of the oscillating plate and $c^{12}$ is the uncoupling capacitor of said plate; $c^{11}$ is the coupling capacitor of the oscillating grid. Said oscillations are mixed with those received by tube $l^5$ from tube $l^6$, through a coupling capacitor $c^{18}$; $r^{15}$ is the injection grid leak resistor of tube $l^5$; $r^{11}$ is a feed resistance of the screen-grid of the hexode and $c^{13}$ is the uncoupling capacitor of said grid. The harmonics generating tube $l^6$ is fed by the oscillations from a tube $l^7$ for example of the triode type, and controlled by a piezo-electric crystal $c^2$, whose basic frequency amounts for example to 100 kc. The circuit of tube $l^7$ comprises the inductance and the capacitor $c^{16}$ and is tuned up to 100 kc. $r^{14}$ is the oscillating grid leak resistor.

Coupling between tube $l^7$ and tube $l^6$ is performed through capacitor $c^{17}$; $r^{13}$ is the grid leak resistor of tube $l^6$; $r^{12}$ is the drop resistance of the screen grid of said tube and $c^{15}$ is the uncoupling capacitor of said grid. At the outlet of the plate of tube $l^6$ is an oscillating circuit comprising a multi-tap inductance $s^8$, having ten taps in the example shown, the handlever 47 of which also connects into the circuit corresponding capacitors $c^{14}$, for tuning up to 400, 500, etc. 1300 kc. The outlet of the plate of tube $l^4$ is connected to the intermediate frequency of the receiver, said device as well as those following it in the receiver being of the conventional type.

The control knob of the thousands mechanically drives the handlevers 42 and 43; the knob of hundreds drives the handlevers 44, 45, 46; the knob of the units drives the variable capacitors $cv^1$ (48), $cv^2$ (49) and $cv^3$ (50).

A detailed description of the manner of operation of a further embodiment of a receiver constructed in accordance with the invention is as follows, illustrative numerical values being used.

Figures 5, 6:
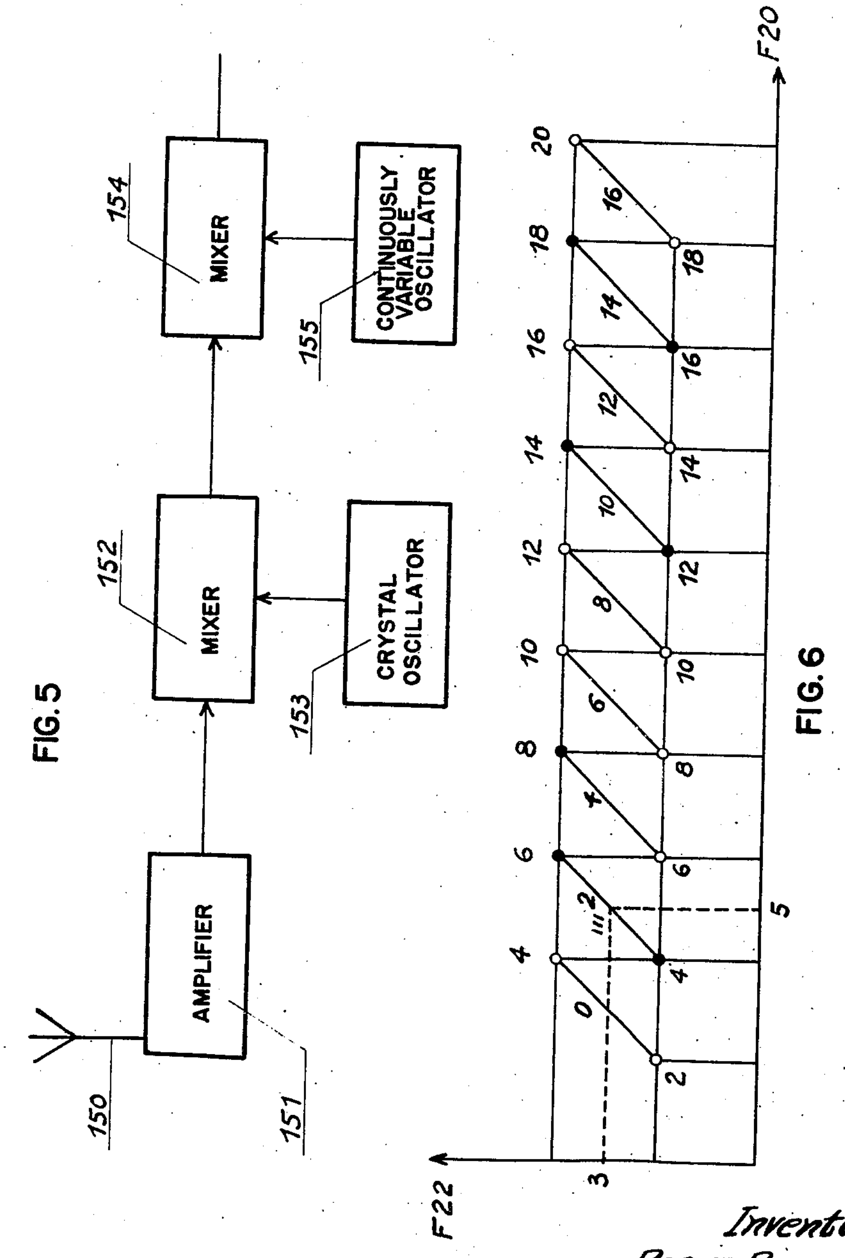
Fig. 5 is a block diagram of a receiver according to an alternative embodiment.
Fig. 6 is a pictorial representation of the local oscillation and intermediate frequencies resulting from an embodiment of the receiver.

Referring to Figure 5 showing a block diagram of the receiver, the incident oscillations having a frequency $F^{20}$ are caught by the aerial 150 and are led to a high frequency amplifier 151. Here they are submitted to a first change in frequency in a device 152, the structure of which will be described hereafter, and which is also fed by oscillations of a frequency $F^{21}$ generated by a local oscillator 153.

The resulting oscillations, of intermediate frequency $F^{22}$, are led to a second frequency changer 154, which is also fed by oscillations of a second local oscillator 155; the resulting oscillations from frequency changer 154 will be the intermediate frequency oscillations of the receiver having a value $F^{24}$.

The oscillations from the frequency changer 152 always have, due to the oscillations generated by the first local oscillator 153, a frequency of a relatively low value for any frequency of the incident oscillations, and accordingly the oscillations of the second local oscillator 155, also may always have a relatively low value, in order to obtain the final intermediate oscillations of fixed frequency. The first oscillator 153, controlled piezo-electrically, introduces only a very small drift. The second local oscillator, generating oscillations with a frequency of a relatively low value, may be of the conventional continuously varying type, and introduces an acceptably small drift.

If for example it is desired to keep the value of the frequency $F^{22}$ between 2 and 4 megacycles in order to use a local oscillator whose frequency $F^{23}$ may vary between 1625 and 3525 kc. in the case of a final intermediate frequency equal to 475 kc., it will be necessary, in order to receive incident oscillations comprised between 2 and 20 megacycles, to generate local oscillations of $F^{21}$ frequency equal to 0, 2, 4, 6 etc. 14, 16 megacycles.

This is shown in the diagram of Fig. 6 in which the values of the frequency $F^{20}$ of the incident oscillations are in abscissas and the intermediate frequencies $F^{22}$ in ordinates. Thus a series of parallel diagonal straight lines are obtained, the value of the local frequency $F^{21}$ to be supplied being constant for any one of said lines. Said value is shown in the diagram adjacent to the corresponding diagonal line.

In the considered example, a first solution consists in using a local oscillator 153 controlled by a piezo-electric crystal having a frequency equal to 2 megacycles and in then extracting successively the various harmonics. But then it would be impossible to receive incident oscillations of a frequency equal to 2 megacycles and to all the multiples of 2 megacycles, because for said values, the local oscillations would always contain the basic frequency equal to 2 megacycles which would cause troublesome interference.

In such case, the present invention further consists in generating local oscillations whose basic frequency may be, at will, 2, 4, 6, or 8 megacycles, obtained for example by means of an oscillator which may be controlled at will by one of four piezo-electric crystals, having resonant frequencies respectively equal to 2, 4, 6, 8 megacycles.

The local frequency of 2 megacycles will be used to receive incident oscillations comprised between 4 and 6 megacycles. The latter frequencies may not be received, of course, in this band due to the interferences caused by the local oscillations having a basic frequency of 2 megacycles. However, the incident oscillations of a frequency equal to 4 megacycles may be received by short-circuiting the local oscillator 153.

As regards the incident oscillations of a frequency comprised between 6 and 8 megacycles, the frequency $F^{21}$ will equal 4 megacycles. This local frequency does not cause any interference except with incident oscillations of a frequency equal to 8 megacycles, but not for those oscillations having a frequency of 6 megacycles.

It is understood that the incident oscillations of 6 megacycles frequency, which could not be received when using a local frequency of 2 megacycles, will be received with a local frequency equal to 4 megacycles.

In the diagram a small black circle has been placed at the ends of the diagonal lines corresponding to incident frequencies which can not be received when using the local frequency corresponding to said line; they are marked with a white circle in the other case.

The ends of the next diagonal line are both marked with a white circle, 8 and 10 not being multiples of 6, as well as those of the next succeeding line, 10 and 12 not being multiples of 8.

To receive incident oscillations of higher frequency, the local oscillations which are used consist in the harmonics of those used to receive oscillations of frequencies between 2 and 12 megacycles.

For the reception of oscillations between 12 and 14 megacycles, a frequency $F^{21}$ is selected equal to 10 megacycles. It will be obtained by using the 5th harmonic of the oscillations supplied by the crystal having a basic frequency of 2 megacycles. Said basic frequency prevents the reception of the band ends when using said local frequency, 12 and 14 being multiples of 2.

To receive incident oscillations between 14 and 16 megacycles, the $F^{21}$ frequency is made equal to 12 megacycles. It will be obtained by using the 2nd harmonic of the local oscillations having a basic frequency of 6 megacycles. The reception of end frequencies is then possible, neither 14 nor 16 being multiples of 6.

The frequency $F^{21}$ for the reception of oscillations between 16 and 18 megacycles is made equal to 14 megacycles and is obtained with the 7th harmonic of the oscillations of the 2 megacycles crystal. The end frequencies of the band then can not be received, 16 and 18 being multiples of 2.

To receive incident oscillations of a frequency between 18 and 20 megacycles, the frequency $F^{21}$ is made equal to 16 megacycles and is obtained by the 2nd harmonic of the local oscillations of basic frequency equal to 8 megacycles. The ends of the band are then received, neither 18 nor 20 being multiples of 8, etc.

In the selected example, when using only four basic local frequencies, incident oscillations of any frequency may be received, comprised in a band as wide as desired, including oscillations having a frequency which is a multiple of the band width of the intermediate frequencies $F^{22}$.

This property is shown in the diagram of Fig. 6 by the fact that there are never two black circles on the same vertical line.

In practice, when the end of a band can not be received, the end of the adjacent band may be slightly extended. For example, the local frequency of 4 megacycles allows reception of incident frequencies having a value slightly lower than 6 megacycles.

The following table gives, in megacycles, the various values of frequencies considered for the reception of incident oscillations, the frequency of which is comprised between 2 and 20 megacycles.

| $F^{20}$ | $F^{21}$ | $F^{22}$ | $F^{23}$ | $F^{24}$ |
|---|---|---|---|---|
| 2 to 4 | 0 | 2 to 4 | 1.525 to 3.525 | 0.475 |
| 4 to 6 | 2 | 2 to 4 | 1.525 to 3.525 | 0.475 |
| 6 to 8 | 4 | 2 to 4 | 1.525 to 3.525 | 0.475 |
| 8 to 10 | 6 | 2 to 4 | 1.525 to 3.525 | 0.475 |
| 10 to 12 | 8 | 2 to 4 | 1.525 to 3.525 | 0.475 |
| 12 to 14 | 10=(2×5) | 2 to 4 | 1.525 to 3.525 | 0.475 |
| 14 to 16 | 12=(6×2) | 2 to 4 | 1.525 to 3.525 | 0.475 |
| 16 to 18 | 14=(2×7) | 2 to 4 | 1.525 to 3.525 | 0.475 |
| 18 to 20 | 16=(8×2) | 2 to 4 | 1.525 to 3.525 | 0.475 |

An alternative embodiment of the present invention allows the use of only two piezo-electric crystals adjusted to the highest basic frequencies in the example previously considered, namely, 6 and 8 megacycles, in order to obtain local oscillations for the first frequency changer.

According to this alternative, the oscillator device corresponding to one of the crystals feeds a first frequency changer device whose resulting oscillations are used in the feed of a second frequency changer.

Figure 7:
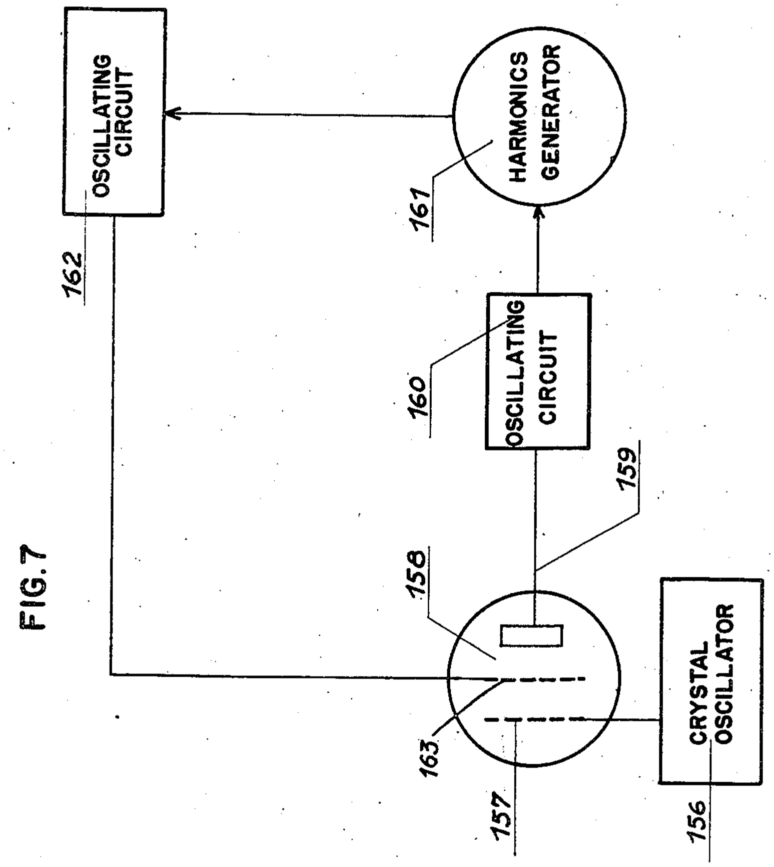
Fig. 7 is a schematic diagram of a local oscillator used in the receiver.

Fig. 7 shows a schematic of such an arrangement. An oscillator 156 feeds a first injection grid 157 of a frequency changing tube 158.

The plate circuit 159 of said tube is tuned up by an oscillating circuit 160 and is connected to a harmonic generating tube 161 whose plate circuit is tuned up by an oscillating circuit 162 connected to a second injection grid 163 of tube 158.

The oscillating circuits 160 and 162 are such that the frequency corresponding to circuit 160 equals the sum or the difference of the frequencies corresponding to oscillator 156 and to oscillating circuit 162. Under such conditions, once tuned up, the tube 158 will operate as a frequency changer.

If for example, the oscillator 156 be stabilized by a piezo-electric crystal of a resonant frequency equal to 6 megacycles and if the oscillating circuits 160 and 162 be adjusted respectively to 2 and 4 megacycles, said arrangement may supply oscillations of a frequency equal to 2 megacycles (taken from oscillating circuit 160); oscillations of a frequency equal to 4 megacycles (taken from oscillating circuit 162), oscillations of a frequency equal to 6 megacycles (directly drawn from the oscillator 156), oscillations of a frequency equal to 10 megacycles (from the 5th harmonic of the oscillations from tube 161), oscillations of a frequency equal to 12 megacycles (drawn from oscillating circuit 160 adjusted then to said value, the tube 158 operating then as harmonics generator), oscillations of a frequency equal to 14 megacycles (drawn from tube 161 of the 7th harmonic of the oscillations feeding said tube).

If in the arrangement shown in Figure 7 the oscillating circuit 160 be adjusted to a value equal to 4 megacycles, the oscillating circuit 162 remaining the same as previously, and if the oscillator 156 be stabilized by a piezo-electric crystal having a proper frequency of 8 megacycles, it is obvious that said arrangement may supply oscillations of a frequency equal to 8 megacycles (drawn directly from the oscillator 156) and oscillations of a frequency equal to 16 megacycles (drawn from the oscillating circuit 160, then adjusting to said value, tube 158 operating then as a harmonics generator).

Accordingly, with two crystals respectively adjusted to 6 and 8 megacycles, oscillations may be obtained at will having a frequency equal to 2, 4, 6, 8 megacycles, free from sub-harmonics, and 10, 12, 14, 16 megacycles, allowing thus the reception of incident oscillations of any frequency comprised between 2 and 20 megacycles.

Figure 8:
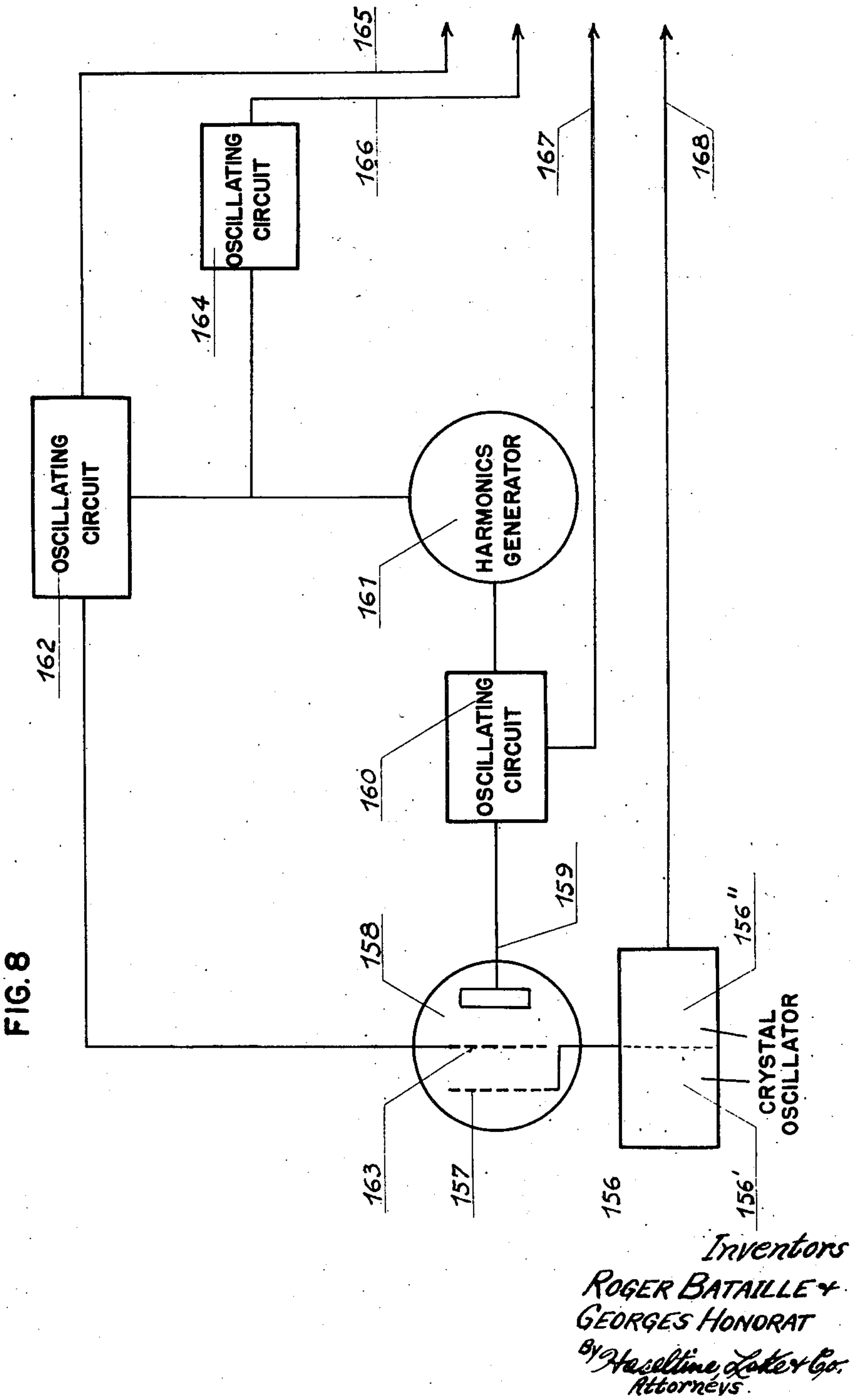
Fig. 8 is a diagram similar to Fig. 7 showing an alternative embodiment.

According to the invention, both arrangements may be combined to obtain said local frequencies, in a single arrangement shown schematically in Fig. 8. The oscillating device 156 comprises two parts 156'' and 156' stabilized by crystals respectively adjusted to 6 and 8 megacycles. The oscillating circuit 160 may at will be adjusted to 2, 4, 12 and 14 megacycles. The oscillating circuit 162 is permanently adjusted to a value of 4 megacycles. An oscillating circuit 164 is series connected into the anode circuit of tube 161 and may be adjusted to 10 and 14 megacycles.

With this single arrangement, the local frequencies may be drawn from connections 165, 166, 167 and 168 with the controls stated as regards the oscillating circuits 160 and 164.

The following table gives the various resulting frequency values for the above discussed numerical examples:

$F^{20}$=incidental frequency
$F^{21}$=first local frequency
$F^{22}$=resulting intermediary frequency
$F^{25}$=frequency from oscillator 156
$F^{26}$=frequency of oscillating circuit 160
$F^{27}$=frequency of oscillating circuit 162
$F^{28}$=frequency of oscillating circuit 164

| $F^{20}$ | $F^{25}$ | $F^{26}$ | $F^{27}$ | $F^{28}$ | $F^{21}$ | $F^{22}$ |
|---|---|---|---|---|---|---|
| 2.000 | 0 | 0 | 0 | 0 | 0 | 2.000 |
| 4.000 | 0 | 0 | 0 | 0 | 0 | 4.000 |
| 4.000 | 6.000 | 2.000 | 4.000 | 0 | 2.000 | 2.000 |
| 6.000 | 6.000 | 2.000 | 4.000 | 0 | 2.000 | 4.000 |
| 6.000 | 8.000 | 4.000 | 4.000 | 0 | 4.000 | 2.000 |
| 8.000 | 8.000 | 4.000 | 4.000 | 0 | 4.000 | 4.000 |
| 8.000 | 6.000 | 0 | 0 | 0 | 6.000 | 2.000 |
| 10.000 | 6.000 | 0 | 0 | 0 | 6.000 | 4.000 |
| 10.000 | 8.000 | 0 | 0 | 0 | 8.000 | 2.000 |
| 12.000 | 8.000 | 0 | 0 | 0 | 8.000 | 4.000 |
| 12.000 | 6.000 | 2.000 | 4.000 | 10.000 | 10.000 | 2.000 |
| 14.000 | 6.000 | 2.000 | 4.000 | 10.000 | 10.000 | 2.000 |
| 14.000 | 6.000 | 12.000 | 0 | 0 | 12.000 | 2.000 |
| 16.000 | 6.000 | 12.000 | 0 | 0 | 12.000 | 4.000 |
| 16.000 | 6.000 | 2.000 | 4.000 | 14.000 | 14.000 | 2.000 |
| 18.000 | 6.000 | 2.000 | 4.000 | 14.000 | 14.000 | 4.000 |
| 18.000 | 8.000 | 16.000 | 0 | 0 | 16.000 | 2.000 |
| 20.000 | 8.000 | 16.000 | 0 | 0 | 16.000 | 4.000 |

Figure 9:
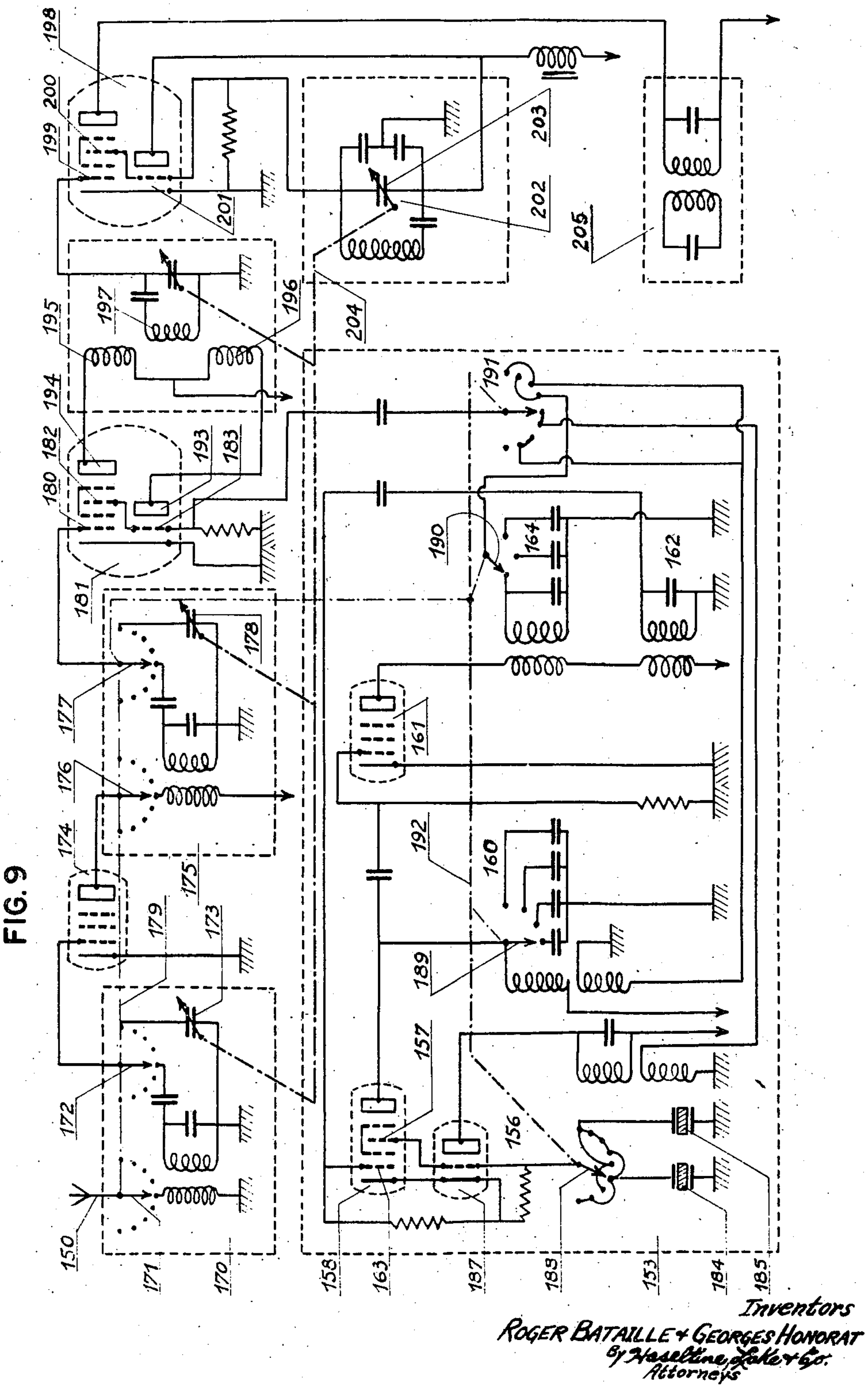
Fig. 9 is a circuit diagram of a receiver employing the oscillation generator shown in Fig. 8.

Fig. 9 is a detailed schematic diagram of a preferred form of a receiver according to the invention. The incident oscillations caught by the antenna 150 flow in an antenna circuit 170 comprising two adjustable contact members 171 and 172, the various steps of which correspond to inductance taps and a controlled variable capacitor 173. Said oscillations are amplified in a tube 174, the plate-circuit 175 of which also comprises two controlling contact members 176 and 177, having steps corresponding to inductance taps, and a variable capacitor 178. The contactors 171, 172, 176 and 177 are coupled by a linkage 179. They are, for example, fitted on and keyed to the same shaft.

The oscillations from plate circuit 175 feed a grid 180 of a frequency changing tube 181. Said tube is also fed on both its other grids 182 and 183 by the local oscillations from a local oscillator 153, which may be as previously described in the reference to Figure 8. Said oscillator comprises two piezo-electric crystals 184 and 185 adjusted respectively as in the above described example, to 6 and 8 megacycles and controlling an oscillator tube 187. Fig. 8 shows the various parts of the unit represented in Fig. 9.

The contacting members 188, 189, 190 and 191 to select the frequency of local oscillation are connected together by a linkage 192. They are preferably keyed on the same shaft as the contactors 171, 172, 176 and 177. From member 191 are drawn the local oscillations injected by the grids 182 and 183 into the frequency changing tube 181. Grid 183 is a part of a triode and grid 182 is a part of a hexode, whose plates 193 and 194 are fitted in opposition and whose common circuit has two windings 195 and 196. Both windings have effects of equal but opposite value on a secondary winding 197, due to the selection of the coupling coefficients of windings 195 and 196 with winding 197. This layout avoids locking of the following frequency changing tube 198 under the action of the first local oscillations. Said frequency changing tube is fed on its grid 199 by the intermediate oscillations from tube 181 and on its grid 200 by the second local oscillations supplied by the triode-oscillator 201 inserted in tube 198, whose frequency may vary in a continuous manner under the action of the oscillating circuit 202 comprising a variable capacitor 203. The variable capacitors 173, 178 and 203 are coupled by a linkage 204. They are for example fitted and keyed to a same shaft. The resulting oscillations from tube 198, having passed the plate circuit 204, will constitute the intermediate frequency oscillations of the receiver, which are treated in the usual manner.

The invention hereinbefore described with refernc to specific examples is obviously not limited to the features given by way of illustration but includes all variations or modifications thereof falling within the spirit or scope of the appended claims.

Figure 4:
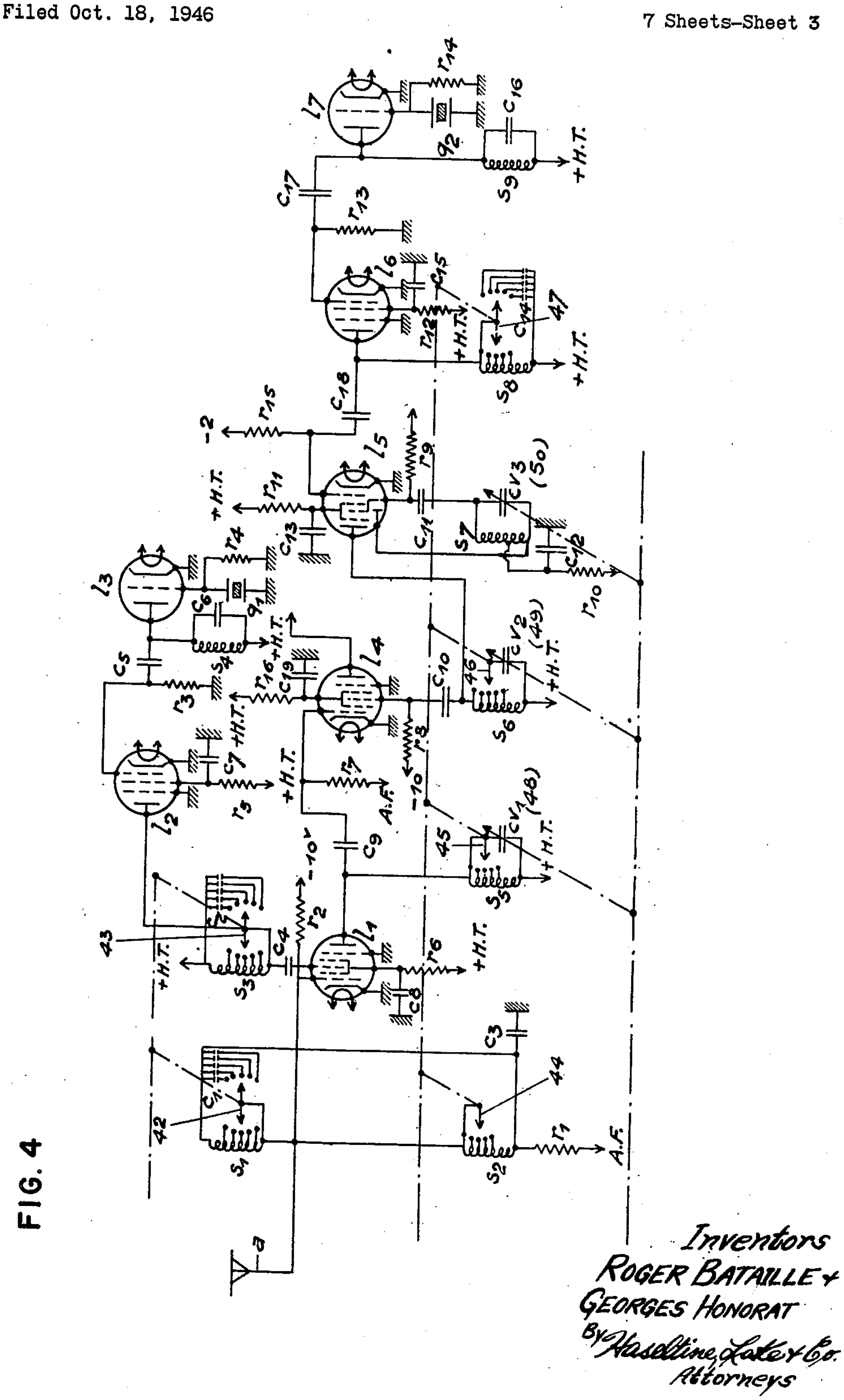
Fig. 4 is a circuit diagram of the receiver shown in Fig. 2.

It will be understood, that, if desired, a second crystal controlled oscillator may have its output mixed with continuously variable oscillations and the sum or difference applied to mixer tube 198, as outlined in the foregoing discussion relative to Figures 2, 3 and 4.

What is claimed is:

1. In a system for receiving radio frequency signals of any frequency selected from a wide, continuous frequency band, in combination: a radio frequency circuit for receiving said signal, a tunable filter in said radio frequency circuit, said filter being tunable over all of the said wide frequency band; a first crystal stabilized local oscillation generator supplying a discontinuous multiplicity of uniformly spaced frequencies having a range the limits of which substantially coincide with the limits of said wide frequency band in the frequency spectrum, a first tuning element connected to said first oscillation generator for selecting one frequency from said discontinuous multiplicity, a first mixer connected to the outputs of both said radio frequency circuit and said first stabilized local oscillation generator, a second tunable filter connected to the output of said mixer and tunable over an interval substantially narrower than said wide frequency band, said interval being substantially not greater than the interval between any two successive frequencies of the uniformly spaced first local oscillations and positioned in the frequency spectrum toward the lower limit of said wide frequency band, a second local oscillation generator variable over substantially the same interval both in width and frequency as said second filter, a second tuning element connected to said second local oscillation generator for varying the frequency of said second local oscillation generator, a second mixer connected to the outputs of both said second filter and said second local oscillation generator, a third filter connected to the output of said second mixer and tuned to a fixed intermediate frequency, said filter having a band pass whose width is substantially less than any of the previous frequencies, a single control connected to both said first tuning element and to said first tunable filter for simultaneously selecting one of said multiplicity of uniformly spaced frequencies and adjusting the pass frequencies of said filter, and a second single control connected to both said second tuning element and both of said first and second tunable filters for simultaneously adjusting the frequencies of said filters and said second local oscillation generator.

2. In a system for receiving radio frequency signals of any frequency selected from a wide, continuous frequency band, in combination: a radio frequency circuit for receiving said signal, a first tunable filter connected into said radio frequency circuit, said filter being tunable over all of said wide band, a crystal stabilized local oscillation generator, a harmonics generator connected to the output of said local oscillation generator and supplying a discontinuous multiplicity of uniformly spaced frequencies having a range the limits of which substantially coincide with the limits of said wide frequency band in the frequency spectrum, a first mixer connected to the outputs of both said harmonics generator and said radio frequency circuit, a second tunable filter connected to the output of said first mixer and tunable over an interval substantially narrower than said wide frequency band, said interval being substantially not greater than the interval between any two successive frequencies of the harmonics generator and positioned in the frequency spectrum toward the lower limit of said wide frequency band, a second local oscillation generator variable over substantially the same frequency interval as said second filter, a second mixer connected to the outputs of both said scond filter and said second local oscillation generator, a first single control connected to both said harmonics generator and said first tunable filter for simultaneously selecting one of said multiplicity of uniformly spaced frequencies and for adjusting the pass frequency of said filter, and a second single control connected to both said second local oscillation generator and said first and second tunable filters for simultaneously adjusting the frequencies of said oscillation generator and said filters, and a third filter connected to the output of said second mixer and tuned to a fixed intermediate frequency.

3. In a system for receiving radio frequency signals of any frequency selected from a wide, continuous frequency band, in combination: a radio frequency circuit for receiving said signal, a first tunable filter connected into said radio frequency circuit, said filter being tunable over all of said wide band, a crystal stabilized local oscillation generator, a harmonics generator connected to the output of said oscillation generator and supplying a discontinuous multiplicity of uniformly spaced frequencies having a range the limits of which substantially coincide with the limits of said wide frequency band in the frequency spectrum, a first mixer connected to the outputs of both said harmonics generator and said radio frequency circuits, a second tunable filter connected to the output of said first mixer and tunable over an interval substantially narrower than said wide frequency band, said interval being substantially not greater than the interval between any two successive frequencies of the harmonics generator and positioned in the frequency spectrum toward the lower limit of said wide frequency band, a second local oscillation generator variable over substantially the same frequency interval as said second filter, a second mixer connected to the outputs of both said second filter and said second local oscillation generator, a first single control connected to both said harmonics generator and said first tunable filter for simultaneously selecting one of said multiplicity of uniformly spaced frequencies and for adjusting the pass frequency of said filter, a second single control connected to both said second local oscillation generator and said first and second tunable filters for simultaneously adjusting the frequencies of said oscillation generator and said filters, a third filter connected to the output of said second mixer and tuned to a fixed intermediate frequency, and means connected to the output of said third filter for detecting and amplifying the said output.

4. In a system for receiving radio frequency signals of any frequency selected from a wide, continuous frequency band, in combination: a radio frequency circuit for receiving said signal, a first tunable filter in said radio frequency circuit, said filter being tunable over said wide frequency band, a first crystal stabilized local oscillation generator for supplying a discontinuous multiplicity of uniformly spaced frequencies having a range the limits of which substantially coincide with the limits of said wide frequency band in the frequency spectrum, a first mixer connected to the outputs of both said radio frequency circuit and of said first local oscillation generator, a second tunable filter connected to the output of said first mixer and tunable over an interval substantially narrower than said wide frequency band, said interval being substantially not greater than the interval between any two successive frequencies of said first local oscillation generator and positioned in the frequency spectrum towards the lower limit of said wide frequency band, a second crystal stabilized local oscillation generator supplying a second discontinuous multiplicity of uniformly spaced frequencies having a range the limits of which are substantially equal to the interval between any two successive frequencies of said first local oscillation generator, a third local oscillation generator continuously variable over a range the limits of which are substantially equal to the interval between any two successive frequencies of said second local oscillation generator, a second mixer connected to the outputs of both said second and said third local oscillation generators, a third tunable filter connected to the output of said second mixer, a third mixer connected to the outputs of said second and third tunable filters, a first single control connected to said first local oscillation generator and to said first tunable filter for simultaneously selecting one of said multiplicity of uniformly spaced frequencies and adjusting the pass frequencies of said filter, a second single control connected to said first, second, and third tunable filters and to said second local oscillation generator for simultaneously selecting one of said second multiplicity of uniformly spaced frequencies and for adjusting the pass frequencies of each of said filters, and a third single control connected to said second and third tunable filters and to said third local oscillation generator for simultaneously adjusting the frequencies of both of said filters and said third local oscillation generator.

5. In a system for receiving radio frequency signals of any frequency selected from a wide, continuous frequency band, in combination: a radio frequency circuit for receiving said signal, a first tunable filter connected into said radio frequency circuit, said filter being tunable over said wide frequency band, a first crystal stabilized local oscillation generator, a first harmonics generator connected to the output of said first local oscillation generator and supplying a discontinuous multiplicity of uniformly spaced frequencies having a range the limits of which substantially coincide with the limits of said wide frequency band in the frequency spectrum, a first mixer connected to the outputs of both said radio frequency circuit and said first harmonics generator, a second tunable filter connected to the output of said first mixer and tunable over an interval substantially narrower than said wide frequency band, said interval being substantially not greater than the interval between any two successive frequencies of said first harmonics generator and positioned in the frequency spectrum towards the lower limit of said wide frequency band, a second crystal stabilized local oscillation generator, a second harmonics generator connected to the output of said second local oscillation generator and supplying a second discontinuous multiplicity of uniformly spaced frequencies having a range the band width of which is substantally equal to the interval between any two successive frequencies of said first harmonics generator, a third local oscillation generator continuously variable over a range the band width of which is substantially equal to the interval between any two successive frequencies of said second harmonics generator, a second mixer connected to the outputs of said second harmonics generator and said third local oscillation generator, a third tunable filter connected to the output of said second mixer, a third mixer connected to the outputs of said second and third tunable filters, a first single control connected to said first harmonics generator and to said first tunable filter for simultaneously selecting one of said first multiplicity of uniformly spaced frequencies and for adjusting the pass frequencies of said filter, a second single control connected to said first, second and third tunable filters and to said second harmonics generator for simultaneously selecting one of said multiplicity of uniformly spaced frequencies and for adjusting the pass frequencies of each of said filters, and a third single control connected to said second and third tunable filters and to said third local oscillation generator for simultaneously adjusting the frequencies of said filters and of said local oscillation generator.

6. In a system for receiving radio frequency signals of any frequency selected from a wide, continuous frequency band, in combination: a radio frequency circuit for receiving said signal, a first tunable filter connected into said radio frequency circuit, said filter being tunable over said wide frequency band, a first crystal stabilized local oscillation generator, a first harmonics generator connected to the output of said first local oscillation generator and supplying a discontinuous multiplicity of uniformly spaced frequencies having a range the limits of which substantially coincide with the limits of said wide frequency band in the frequency spectrum, a first mixer connected to the outputs of both said radio frequency circuit and said first harmonics generator, a second tunable filter connected to the output of said first mixer and tunable over an interval substantially narrower than said wide frequency band, said interval being substantially not greater than the interval between any two successive frequencies of said first harmonics generator and positioned in the frequency spectrum towards the lower limit of said wide frequency band, a second crystal stabilized local oscillation generator, a second harmonics generator connected to the output of said second local oscillation generator and supplying a second discontinuous multiplicity of uniformly spaced frequencies having a range the band width of which is substantially equal to the interval between any two successive frequencies of said first harmonics generator, a third local oscillation generator continuously variable over a range the band width of which is substantially equal to the interval between any two successive frequencies of said second harmonics generator, a second mixer connected to the outputs of said second harmonics generator and said third local oscillation generator, a third tunable filter connected to the output of said second mixer, a third mixer connected to the outputs of said second and third tunable filters, a first single control connected to said first harmonics generator and to said first tunable filter for simultaneously selecting one of said first multiplicity of uniformly spaced frequencies and for adjusting the pass frequencies of said filter, a second single control connected to said first, second and third tunable filters and to said second harmonics generator for simultaneously selecting one of said multiplicity of uniformly spaced frequencies and for adjusting the pass frequencies of each of said filters, a third single control connected to said second and third tunable filters and to said third local oscillation generator for simultaneously adjusting the frequencies of said filters and of said local oscillation generator, and amplifying and detecting means connected to the output of said third mixer.

7. In a system for receiving radio frequency signals of any frequency selected from a wide, continuous frequency band, in combination: a tuned means to which radio frequency signals are applied, a crystal stabilized local oscillation generator supplying a discontinuous multiplicity of uniformly spaced frequencies having a range substantially coinciding with said wide frequency band in the frequency spectrum, a first tuning element connected to said first local oscillation generator for selecting one frequency from said discontinuous multiplicity of frequencies, a first mixer connected to the outputs of both said first local oscillation generator and said antenna, a second local oscillation generator continuously variable over an interval substantially narrower than said wide band, said interval being substantially not greater than the interval between any two successive frequencies of the uniformly spaced first local oscillations and positioned in the frequency spectrum toward the lower limit of said wide frequency band, a second tuning element connected to said second local oscillation generator and a second mixer connected to the outputs of both said second local oscillation generator and said first mixer, wherein said first stabilized local oscillation generator comprises a crystal stabilized oscillator, an electronic tube having a first grid connected to the output of said oscillator and a plate circuit including a first oscillatory circuit, a harmonics generator coupled with said oscillatory circuit, and a second oscillatory circuit coupled with said harmonics generator and connected to a second grid of said tube, whereby said tube may operate as a frequency changer.

8. In a system for receiving radio frequency signals of any frequency selected from a wide, continuous frequency band, in combination: a tuned means to which radio frequency signals are applied, a crystal stabilized local oscillation generator supplying a discontinuous multiplicity of uniformly spaced frequencies having a range substantially coinciding with said wide frequency band in the frequency spectrum, a first tuning element connected to said first local oscillation generator for selecting one frequency from said discontinuous multiplicity of frequencies, a first mixer connected to the outputs of both said first local oscillation generator and said antenna, a second local oscillation generator continuously variable over an interval substantially narrower than said wide band, said interval being substantially not greater than the interval between any two successive frequencies of the uniformly spaced first local oscillations and positioned in the frequency spectrum toward the lower limit of said wide frequency band, a second tuning element connected to said second local oscillation generator and a second mixer connected to the outputs of both said second local oscillation generator and said first mixer, wherein said first stabilized local oscillation generator comprises an oscillator, two crystals controlling the frequency thereof, a selector for selectively connecting either one of said crystals to said oscillator, an electron tube having a first grid coupled with said oscillator and a plate circuit including a first oscillatory circuit, a harmonics generator coupled with said oscillatory circuit, and a second oscillatory circuit coupled with said harmonics generator and leading to a second grid of said tube, whereby said tube may operate as a frequency changer.

9. In a system for receiving radio frequency signals of any frequency selected from a wide, continuous frequency band, in combination: a tuned means to which radio frequency signals are applied, a crystal stabilized local oscillation generator supplying a discontinuous multiplicity of uniformly spaced frequencies having a range substantially coinciding with said wide frequency band in the frequency spectrum, a first tuning element connected to said first local oscillation generator for selecting one frequency from said discontinuous multiplicity of frequencies, a first mixer connected to the outputs of both said first local oscillation generator and said antenna, a second local oscillation generator continuously variable over an interval substantially narrower than said wide band, said interval being substantially not greater than the interval between any two successive frequencies of the uniformly spaced first local oscillations and positioned in the frequency spectrum toward the lower limit of said wide frequency band, a second tuning element connected to said second local oscillation generator and a second mixer connected to the outputs of both said second local oscillation generator and said first mixer, wherein said stabilized local oscillation generator comprises an oscillator, two crystals controlling the frequency thereof, a selector for selectively connecting either one of said crystals to said oscillator, an electron tube having a first grid coupled with said oscillator and a plate circuit including a first oscillatory circuit, a harmonics generator coupled with said oscillatory circuit, and a second oscillatory circuit coupled with said harmonics generator and leading to the second grid of said tube, whereby said tube may operate as a frequency changer, and selecting means for selectively coupling the outputs of any of said crystal stabilized oscillator, said tube, said first and second oscillatory circuits, or said harmonics generator to said first mixer.

ROGER BATAILLE.
GEORGES HONORAT.

REFERENCES CITED

The following references are of record in the file of this patent:

UNITED STATES PATENTS

| Number | Name | Date |
|---|---|---|
| 2,017,712 | Downey | Oct. 15, 1935 |
| 2,055,737 | Terman | Sept. 29, 1936 |
| 2,131,558 | Granger | Sept. 27, 1938 |
| 2,150,553 | Koch | Mar. 14, 1939 |
| 2,150,562 | Reid | Mar. 14, 1939 |
| 2,173,898 | Copron | Sept. 26, 1939 |
| 2,186,980 | Lowell | Jan. 16, 1940 |
| 2,209,959 | Chittick | Aug. 6, 1940 |
| 2,215,775 | Banfield | Sept. 24, 1940 |
| 2,263,634 | Landon | Nov. 25, 1941 |
| 2,265,083 | Peterson | Dec. 2, 1941 |
| 2,270,023 | Ramsey | Jan. 13, 1942 |
| 2,282,092 | Roberts | May 2, 1942 |
| 2,354,148 | Shaw | July 18, 1944 |
| 2,360,764 | Crosby | Oct. 17, 1944 |